US009592634B2

United States Patent
Monti

(10) Patent No.: US 9,592,634 B2
(45) Date of Patent: Mar. 14, 2017

(54) SEALING DEVICE FOR A POUCHED STRIP TO A CLADDING FILM SUCH AS TO OBTAIN A BLISTER STRIP

(71) Applicant: Marchesini Group S.p.A., Pianoro (IT)

(72) Inventor: Giuseppe Monti, Pianoro (IT)

(73) Assignee: MARCHESINI GROUP S.p.A., Pianoro (Bologna) (IT)

( * ) Notice: Subject to any disclaimer, the term of this patent is extended or adjusted under 35 U.S.C. 154(b) by 721 days.

(21) Appl. No.: 13/939,420

(22) Filed: Jul. 11, 2013

(65) Prior Publication Data

US 2014/0013717 A1 Jan. 16, 2014

(30) Foreign Application Priority Data

Jul. 12, 2012 (IT) ................ B02012A0379

(51) Int. Cl.
*B29C 65/00* (2006.01)
*B65B 51/14* (2006.01)
*B65B 9/04* (2006.01)
*B65B 51/32* (2006.01)
*B29C 65/18* (2006.01)
*B29C 65/78* (2006.01)
*B29L 31/00* (2006.01)
*B29C 65/44* (2006.01)

(52) U.S. Cl.
CPC ............. *B29C 66/80* (2013.01); *B29C 65/18* (2013.01); *B29C 65/7897* (2013.01); *B29C 66/0342* (2013.01); *B29C 66/112* (2013.01); *B29C 66/131* (2013.01); *B29C 66/53461* (2013.01); *B29C 66/8181* (2013.01); *B29C 66/83221* (2013.01); *B29C 66/849* (2013.01); *B65B 9/04* (2013.01); *B65B 51/14* (2013.01); *B65B 51/32* (2013.01); *B29C 65/44* (2013.01); *B29C 66/7422* (2013.01); *B29L 2031/7164* (2013.01)

(58) Field of Classification Search
CPC .... B29C 66/0342; B29C 66/8181; B65B 9/04
USPC .......................................... 53/477
See application file for complete search history.

(56) References Cited

U.S. PATENT DOCUMENTS

| 5,269,123 | A | * | 12/1993 | Marchesini | ............. B29C 65/18 53/329.4 |
| 6,109,000 | A | * | 8/2000 | Conti | ............. B29C 65/18 53/282 |
| 6,941,729 | B2 | * | 9/2005 | Dal Pozzo | ........ B29C 66/83411 264/235 |

(Continued)

*Primary Examiner* — Andrew M Tecco
*Assistant Examiner* — Chelsea Stinson
(74) *Attorney, Agent, or Firm* — R. Neil Sudol; Henry D. Coleman

(57) ABSTRACT

A sealing device (D) for sealing a pouched strip (N) to a cladding film (P) for obtaining a blister strip (B) has a pair of pair of heat-welding plates (10) for sealing, by heat-welding, the film (P) and the strip (N), thereby obtaining the blister strip (B). A sliding element (11), for sliding the blister strip (B) released by the pair of heat welding plates (10) is provided with a curved sliding surface (110) for receiving the blister strip (B). The device (D) further has a device (20) for forcing the blister band (B) to slide along and in contact with the curved sliding surface (110), and a device (30) for directing at least one cooling fluid to cross the sliding element (11) so as to cool the blister strip (B) during the sliding thereof along the curved sliding surface (110).

13 Claims, 5 Drawing Sheets

(56) References Cited

U.S. PATENT DOCUMENTS

| | | | |
|---|---|---|---|
| 7,416,631 B2* | 8/2008 | Pasternicki | B65B 11/50 |
| | | | 156/293 |
| 7,456,946 B2* | 11/2008 | Ackley, Jr. | B23K 26/0838 |
| | | | 219/121.7 |
| 2005/0268578 A1* | 12/2005 | Hahnel | B65B 57/08 |
| | | | 53/553 |
| 2006/0117718 A1* | 6/2006 | Christ | B29C 65/18 |
| | | | 53/478 |
| 2011/0120064 A1* | 5/2011 | Krahl | B29C 66/83221 |
| | | | 53/559 |
| 2014/0305073 A1* | 10/2014 | Monti | B65B 1/02 |
| | | | 53/51 |

\* cited by examiner

SEALING DEVICE FOR A POUCHED STRIP TO A CLADDING FILM SUCH AS TO OBTAIN A BLISTER STRIP

FIELD OF THE INVENTION

The present invention inserts in the technical sector relative to apparatus for realizing packing of products (such as for example pharmaceutical products, para-pharmaceutical products, etc.) in blister packs.

DESCRIPTION OF THE PRIOR ART

These apparatus comprise unwinding a strip of heat-formable plastic material from a reel and realizing thereon pouches, inside of which the products will then be inserted.

Once the products have been inserted internally of the pouches, the pouched strip is then sealed by a cladding film (for example made of aluminum), thus obtaining a continuous blister strip.

Lastly, blister strip is cut to obtain the single blister packs which will then be inserted in corresponding containers.

One of the most critical steps is without doubt the sealing step of the cladding film on the pouched strip so as to generate the continuous blister pouch which will then have to be cut into the single packs: this step is carried out using heat-welding, i.e. by means of application of heat once the cladding strip has been positioned above the pouched strip with the products inserted.

A type of known apparatus includes realizing the step of superposing the film on the pouched strip and the step of sealing the film on the pouched strip by means of heat-welding by advancing the pouched strip with the film superposed thereon along a horizontal advancing section and using a heat-welding device constituted by a pair of heat-welding plates which are neared to one another such as to grip the pouched strip and the cladding film and perform the heat-welding thereof.

The lower plate of the pair of heat-welding plates is provided with appropriate niches or recesses of an appropriate shape for receiving and housing the cells internally thereof, so as not to damage them during the gripping of the pouched strip.

The device includes a common frame for the pair of heat-welding plates which is cyclically movable with an alternating translating motion with respect to the advancing direction of the pouched strip and the cladding film along the horizontal section.

In particular, the frame is translatable in an opposite direction to the advancing direction of the strip and the film when the two plates are separated from one another, while after the plates have been neared to one another to perform the heat-welding of the film on the pouched strip, the frame is translated in the advancing direction of the strip such as to accompany the strip and the film in the advancing direction thereof during the reciprocal welding.

The heat-welding between the cladding film and the pouched strip is done at relatively high temperatures, and since the materials the cladding film and the pouched strip are made of are different to one another the strip and the film will behave differently and a react differently to the variations in temperature (application of heat and subsequent cooling).

This has the drawback of causing a bowing of the blister pack.

In an attempt to obviate this drawback, use has been made of a second pair of plates, arranged downstream of the heat-welding plates, once more along the horizontal advancing section, which grip the blister strip once released by the heat-welding plates so as to cool it more rapidly with respect to a natural cooling by simple heat exchange with the surrounding environment.

In this regard, the upper plate of the second pair of plates is crossed internally by a cooling liquid.

This second pair of plates is also borne by a relative frame which is cyclically mobile translatingly and alternatingly with respect to the advancing direction of the blister strip along the horizontal section.

When the heat-welding plates grip the pouched strip and the cladding film for the heat-welding thereof, the cooling plates are separated and the support frame thereof is translated in an opposite direction to the advancing direction of the strip and the film to near them to the heat-welding plates, while when following welding the heat-welding plates are separated, the cooling plates are locked so as to grip the just-made blister strip, and then translated in the advancing direction of the blister strip such as to accompany the strip during cooling thereof.

However, recourse to this solution has not led to appreciable and satisfactory results as the blister strip, once released by the two cooling plates, exhibits a temperature that is still quite high, which again determines the creation of a certain curvature in the blister strip, which remains even once it has been cut so as to obtain the single blister packs.

This is mainly due to the fact that the time during which the blister strip is gripped between the two cooling plates is not sufficient to significantly cool the blister strip, which therefore will be subject, as just mentioned, to the onset of a significant curvature during the course of the subsequent cooling towards ambient temperature.

The blister packs obtained therefore also exhibit a curvature which leads to various problems, especially during the step of insertion thereof in corresponding packs, beyond being unpleasant from the aesthetic point of view for the final product to be put up for sale.

At present, in substance, recourse to a second pair of plates for gripping and cooling the blister strip just formed by heat-welding of the cladding film to the pouched strip has not been effective in significantly obviating the problems related to onset of a certain degree of curvature of the blister strip obtained following the heat-welding between the cladding film and the pouched strip.

SUMMARY OF THE INVENTION

The aim of the present invention is therefore to provide a sealing device for a pouched strip with a cladding film such as to obtain a blister strip able to obviate the above-mentioned drawbacks present in the prior art.

In particular, an aim of the present invention is to provide a sealing device of a pouched strip with a cladding film which enables obtaining a blister strip free of undesired curvature.

The above-cited aim is obtained with a sealing device of a pouched strip with a cladding film for obtaining a blister strip.

Other advantageous characteristics of the device of the present invention are set out as discussed further below.

BRIEF DESCRIPTION OF THE DRAWINGS

The characteristics of the sealing device of a pouched strip with a cladding film for obtaining a blister strip of the present invention are described in the following with reference to the appended tables of drawings, in which:

FIG. 5A is a partial lateral schematic view of some components of the device while

DESCRIPTION OF PREFERRED EMBODIMENTS

With reference to the accompanying tables of drawings, reference (D) denotes the sealing device of a pouched strip (N) with a cladding film (P) for obtaining a blister strip (8) which is the object of the invention.

Figure 4:
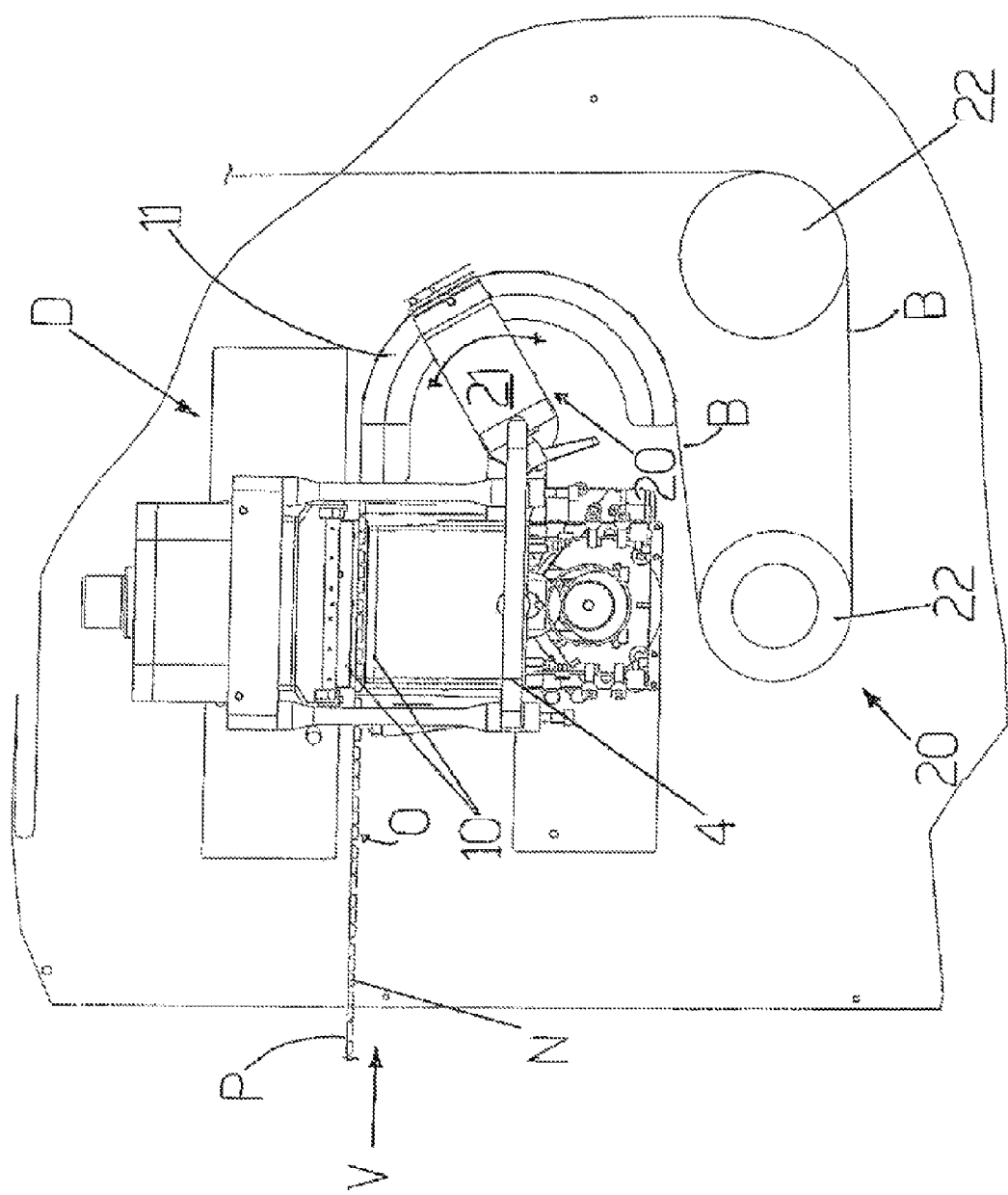
FIG. 4 is a lateral schematic view of the device of FIG. 1 and the position thereof in relation to the advancement pathway of the pouched strip and the cladding film applied thereon, before reciprocal sealing, and the following advancement pathway of the blister strip obtained following sealing thereof.

The device (D) of the present invention is particularly applied in the automatic apparatus for packing products in blister packs, where the pouched strip (N), after having undergone the heat-forming process of the pouches and the pouches filled with corresponding products, is advanced in an advancement direction (V) along a section of horizontal advancement (O) and is clad with a cladding film (P) applied thereon during the advancement thereof along the section of horizontal advancement (O) (see for example FIG. 4).

The device (D) comprises a pair of heat-welding plates (10) arranged opposite one another and cyclically movable in such a way as to reciprocally lock in order to clamp the pouched strip (N) and the cladding film (P) applied thereon together in order to perform a reciprocal sealing thereof by heat-welding and obtain a blister strip (B) and then distanced in order to release the blister strip (8).

In known ways, the lower plate of the pair of plates exhibits recesses (not illustrated in detail in the accompanying figures) of a suitable shape for housing and receiving the pouches of the pouched strip (N) when the plates (10) are locked together to clamp the pouched strip (N) and the cladding film (P).

Figure 5A:
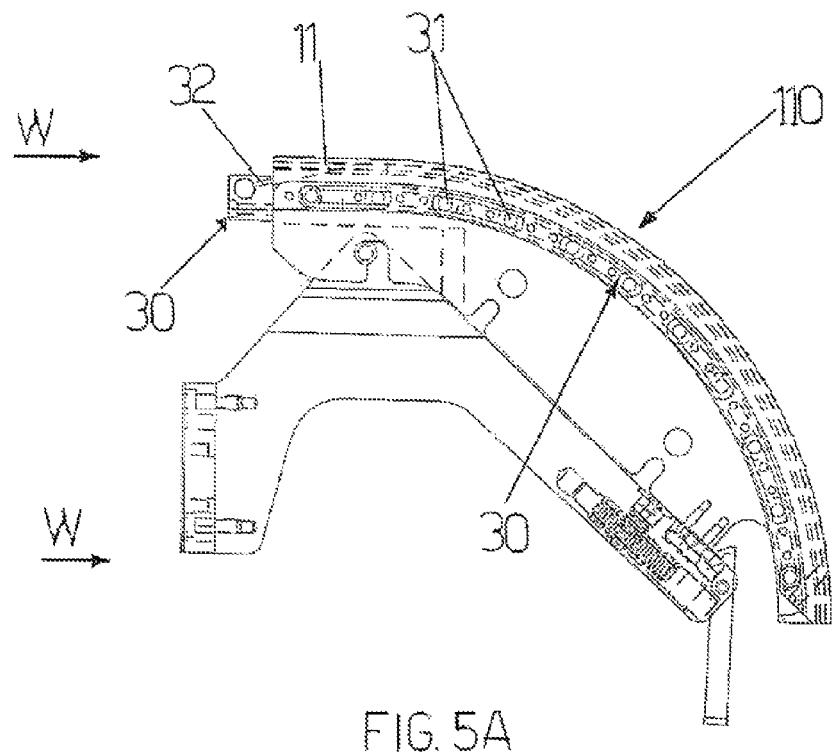
Figure 5B:
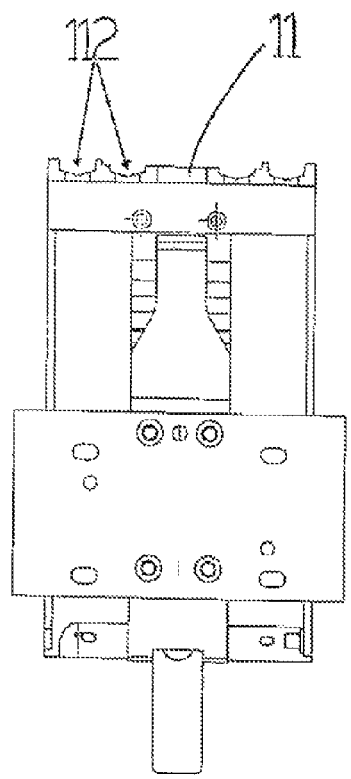
FIG. 5B illustrates a view along the direction of the arrows W-W of FIG. 5A.

The device (D) of the present invention has the peculiarity of comprising a sliding element (11) (for example clearly visible in FIG. 2, and in FIG. 5A), arranged consecutively to the pair of heat-welding plates (10) in the advancement direction M of the pouched strip (N) and the cladding film (P), for sliding the blister strip (8) once released by the pair of heat-welding plates (10).

Figure 1:
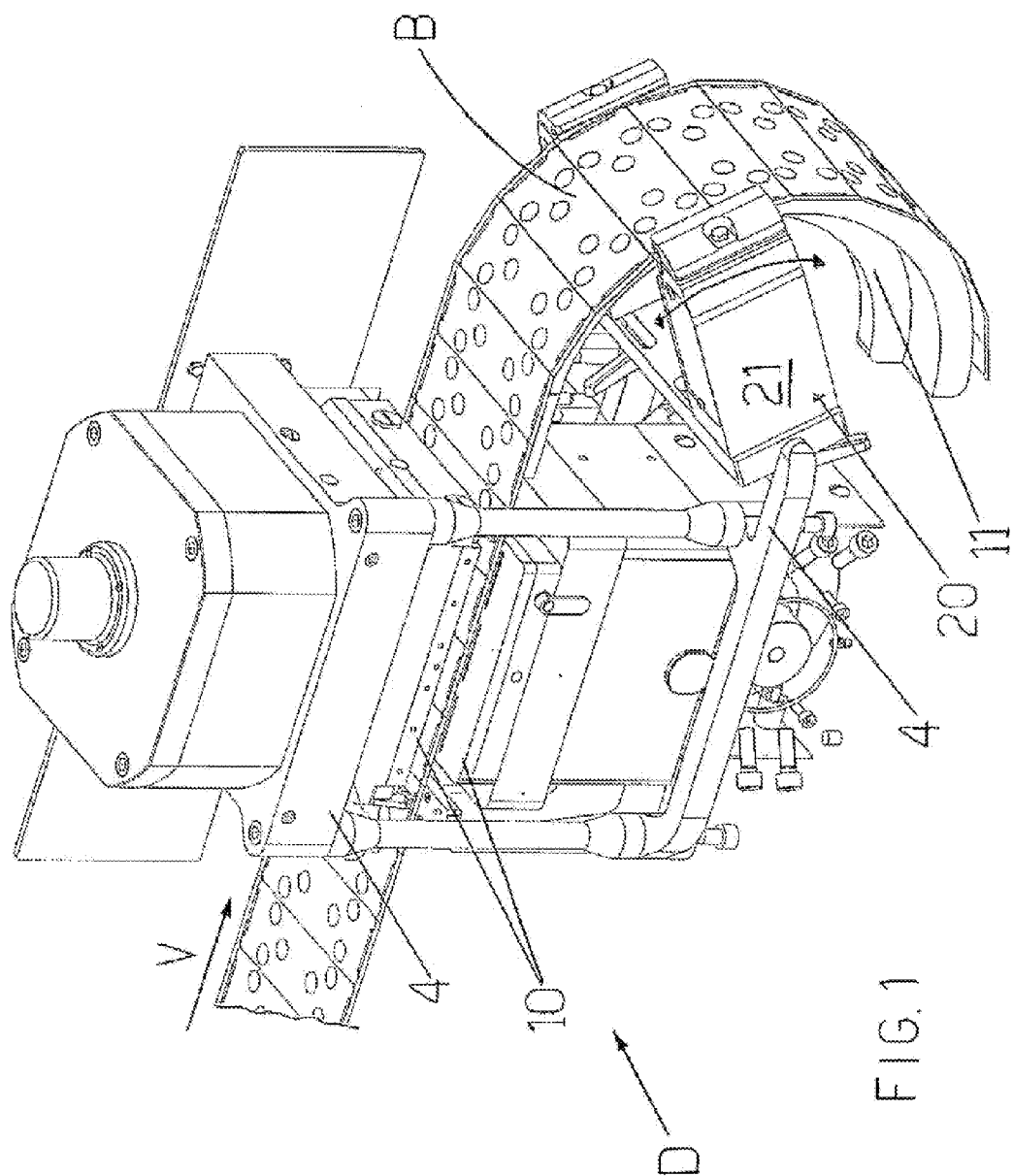
FIG. 1 is a schematic perspective view of the device of the invention in a step in which a sealing has just been made of a portion of pouched strip with a portion of cladding strip and wherein the pathway of the just-made blister strip is illustrated.
Figure 2:
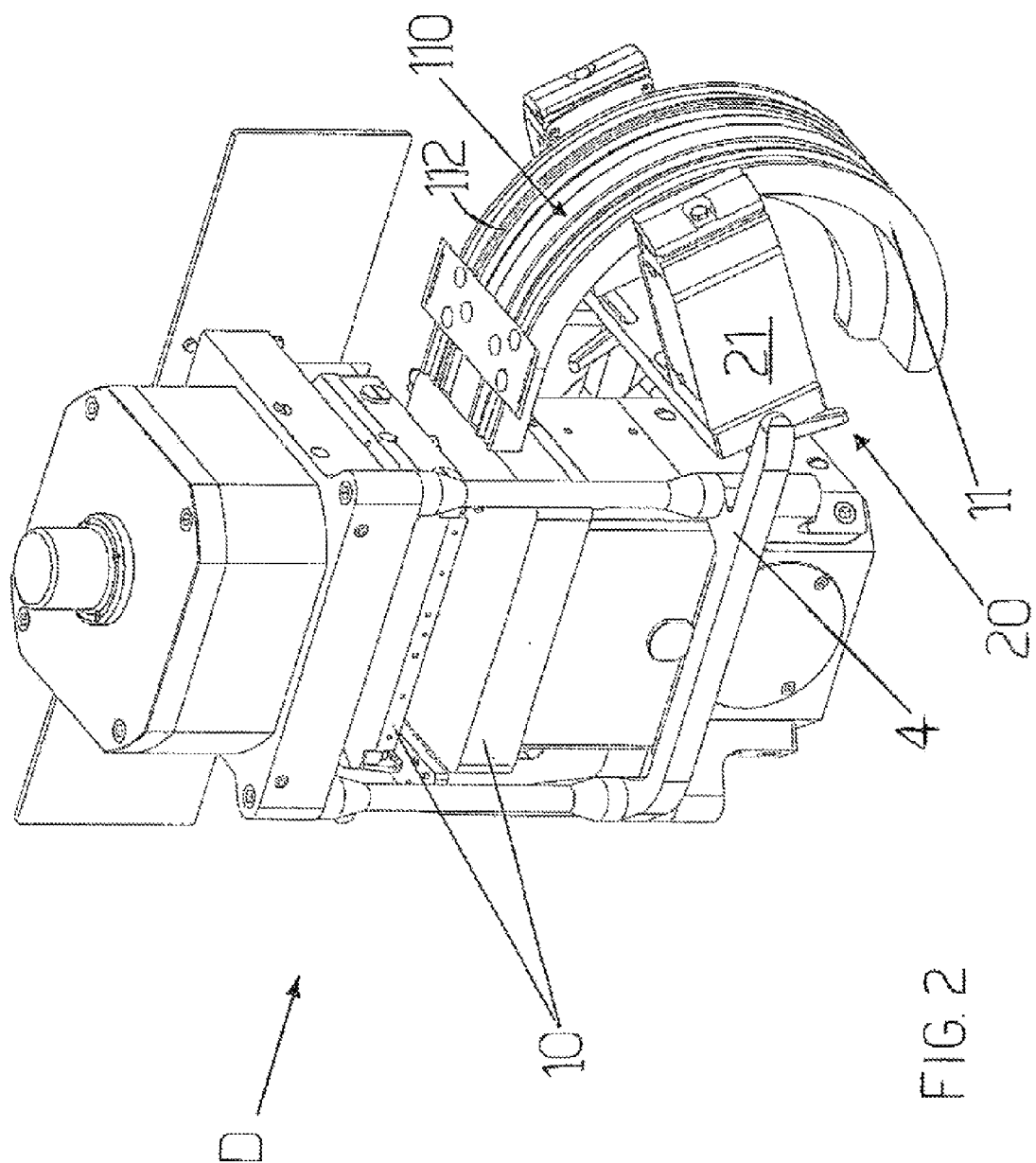
FIG. 2, another schematic perspective view, illustrates the device of FIG. 1 in which the pouched strip and the cladding film have been removed, as has the blister strip obtained by the sealing thereof, in order better to evidence some particular characteristics of components of the device.

In detail, the peculiarity of the device (O) consists in the fact that the sliding element (11) is provided with a curved sliding surface (110) for sliding the blister strip (B) just released by the pair of heat-welding plates (110) (for example the curved sliding surface (100) is visible in detail in FIG. 2).

The device (D) further comprises a device (20) for forcing the blister strip (B) to slide along and in contact with the curved sliding surface (110) of the sliding element (11), and a device (30) for directing at least a cooling fluid to cross the sliding element (11) for cooling the blister strip (B) during sliding thereof along the curved sliding surface (110).

In this way, the blister strip (B) just formed (sealing by heat-forming of the cladding strip with the pouched strip) is forced to follow and slide on the curved sliding surface (110) and in the meantime it is subjected to a cooling action.

The curvature of the curved sliding surface (110) is selected so as to bend the blister strip (B) in an opposite direction to the curvature which would occur in the blister strip in the heat-forming process and subsequent cooling, due to the different thermal behavior of the materials with which the pouched strip (N) and the cladding film (P) are made.

In practice, the device (D), with the aid of the device (20) for sliding the blister strip (B) along the curved sliding surface (110), "mechanically" forces the blister strip (B) to be subject to a curvature contrary to what it would be subjected to during the cooling process and, at the same time, thanks to the device (30) for directing at least a cooling fluid to cross the sliding element (11), cools the blister strip (B) while it is thus curved.

The combination of these effects is such that the blister strip (B), once cooled; and in the following part of the pathway towards the successive stations of the packing apparatus of the blister pack (for example the cutting zone and the packing zone internally of the boxes), no longer exhibits an undesired curvature as happens at present in the prior art.

Further, the device (D) of the present invention, with respect to the prior-art devices which use the pair of cooling plates downstream of the two heat-welding plates, enables carrying out a more effective cooling as, thanks to the presence of the sliding element with the curved sliding surface, the blister strip, given a same space used, will be in contact longer with the curved surface and thus will be subject to a cooling action for a longer period of time with respect to the prior art.

The blister strip (B) in outlet from the sealing device of the invention in fact exhibits a significantly lower temperature with respect to the prior art.

Other advantageous characteristics of the device of the present invention are described in the following.

The device (20) for forcing the blister strip (B) to slide along and in contact with the curved sliding surface (110) of the sliding element (11) comprises at least a gripping organ (21) which is predisposed so as to be positioned laterally with respect to the sliding element (11) and to be movable alternatingly with respect to the sliding element (11) so as to be following the progression of the curved sliding surface (110).

For example, as illustrated in the figures, the device (D) can be provided with two pliers gripping organs (21) arranged laterally and on opposite sides of the sides of the curved sliding surface (110).

Each pliers gripping organ (21) can be commanded to be arranged laterally and at the start of the curved sliding surface (110), to grip the blister strip (B) released by the pair of heat-welding plates (10), once they have completed the heat-welding and are distanced from one another, and to accompany the blister band (8) to slide along at least a part of the curved sliding surface (110).

The device (20) for forcing the blister band (B) to slide along and in contact with the curved sliding surface (110) of the sliding element (11) can comprise (such as for example illustrated in FIG. 4) also at least one return roller (22)

situated downstream of the sliding element (11) and arranged with respect to the sliding element (11) in a position so as to force the blister strip (B) to remain in contact with the curved sliding surface for the whole surface thereof.

The at least one return roller (22) is also destined to re-direct the blister strip (B) in an appropriate advancement direction for the proceeding part of the advancement pathway towards the successive operating stations provided in the automatic packing apparatus.

For example, in the non-exclusive embodiment of FIG. 4, two return rollers (22) can be included, arranged flanked relative to one another so as to re-direct the blister strip (B) once it has exited from the sliding element (11), in a vertical advancement direction.

As illustrated in the accompanying figures relating to a preferred but not exclusive embodiment of the invention, the device (D) is provided with a curved sliding surface (110) which exhibits an arc of circumference shape.

The sliding element (11) of the device (D) is arranged in such a way that the curved sliding surface (110), having an arc of circumference shape, is facing downwards, as illustrated for example in the figures.

The curved sliding surface (110), in the form of an arc of circumference, preferably exhibits an extension of about 180°.

The curved sliding surface (110) further exhibits grooves (112) having a suitable shape for internally receiving the pouches present in the pouched strip (N).

The above-mentioned device (30) for directing at least one cooling fluid to cross the sliding element (11) comprise a tube (31) in a serpentine shape (visible for example in part in figure SA) situated internally of the sliding element (11) and exhibiting a development which is such as to follow the extension of the curved sliding surface (110) and is configured to be crossed by a cooling fluid.

In the device (D) the device (30) for directing at least one cooling fluid to cross the sliding element (11) can also advantageously comprise at least one nozzle (32) (visible for example in FIG. 5A), connected to a source of compressed air, which is arranged between the pair of heat-welding plates (10) and the sliding element (11) in such a way as to direct a flow of compressed air generated by the compressed air source towards the sliding element (11) between the blister strip (B) and the curved sliding surface (110).

The flow of compressed air which is directed by the nozzle (32) between the blister strip (B), about to be forced to slide along the curved sliding surface (110), and the sliding element (11) will flow while remaining trapped between them and being thus also channeled along the channels (112) present on the curved sliding surface (110), substantially contributing, together with the cooling liquid which flows internally of the serpentine (31), to an effective cooling of the blister strip (B).

The device (D) further comprises a frame (4) which supports both the pair of heat-welding plates (10) and the sliding element (11) and on which frame (4) the at least one pliers gripping organ (21) is pivoted, rotatably with respect to the sliding element (11) and thus also with respect to the curved sliding surface (110).

The frame (4) is alternatingly translatingly mobile with respect to the advancement direction (V) of the pouched strip (N) and the cladding film (P) applied thereon.

In particular, in order to enable the pair of heat-welding plates (10) to perform the sealing of the cladding film (P) on the pouched strip (N) without interrupting the advancement thereof, the frame (10) is mobile in translation, with respect to the pouched strip (N) and the cladding film (P) applied thereon, in an opposite direction to the advancement direction (V) of the pouched strip (N) when the pair of heat-welding plates (10) are distanced from one another once the sealing has been done, while the frame (4) is movable in translation in the same advancement direction M as the pouched strip (N) when the pair of heat-welding plates (10) are clamped for heat-welding, such that the clamped plates (10) accompany the advancement of the pouched strip (N) along the horizontal tract (O) during the heat-welding.

Figure 3:
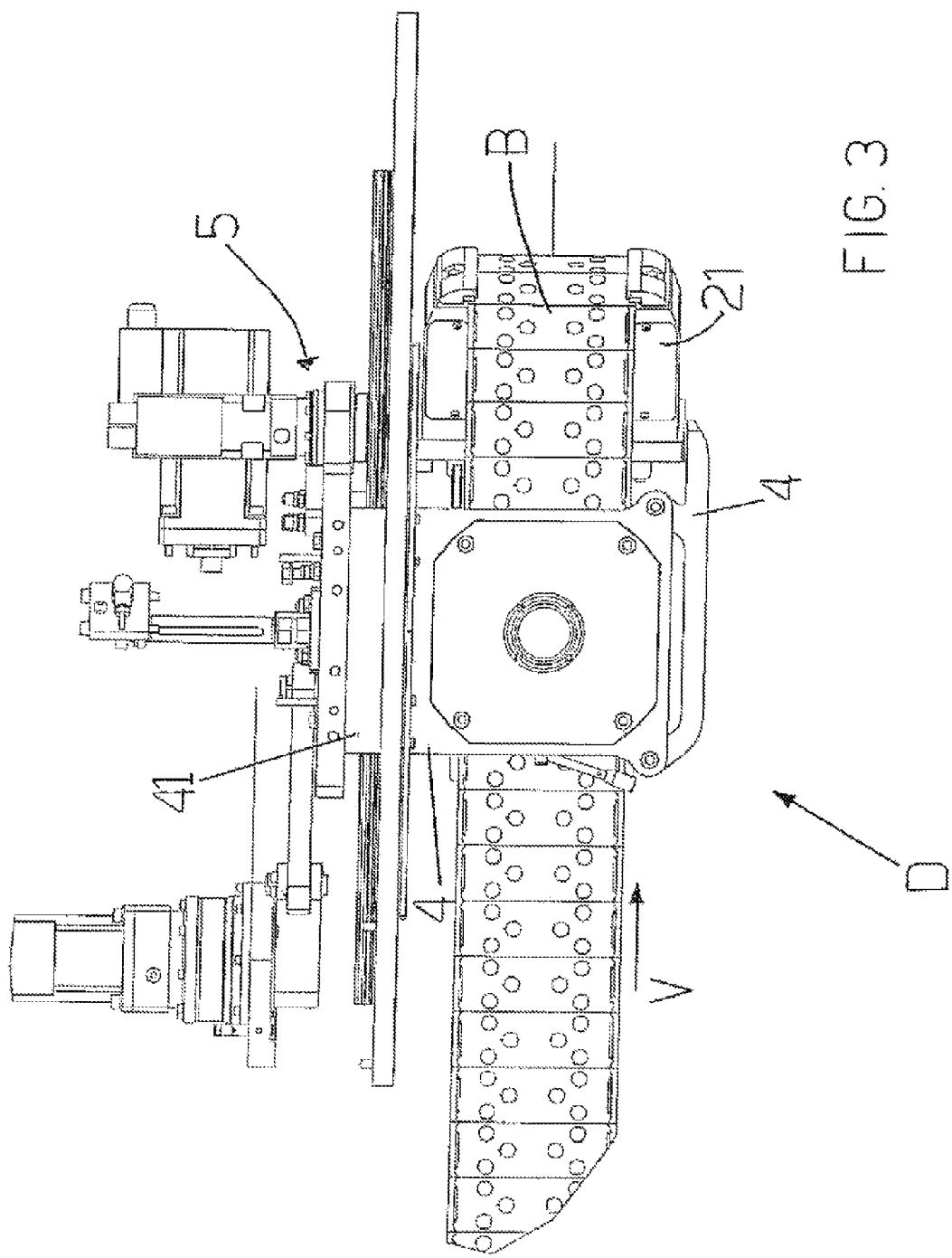
FIG. 3 is a view from above of the device of FIG. 1.

In this regard, as for example illustrated in FIG. 3, the frame (4) is mounted on a slide (41) screwable in alternating translation by appropriate actuator organs (5).

The above has been described by way of non-limiting example, and any possible constructional variants are understood to fall within the scope of the following claims.

The invention claimed is:

1. A sealing device for sealing a pouched strip to a cladding film so as to obtain a blister strip, the pouched strip being advanced in an advancement direction along a horizontal advancement tract and the cladding film being applied on the pouched strip during advancement thereof along the horizontal advancement tract, the sealing device comprising:
a pair of heat-welding plates arranged opposite one another and cyclically movable in such a way as to reciprocally lock in order to clamp the pouched strip and the cladding film applied thereon together for performing a reciprocal sealing thereof by heat-welding, thereby obtaining a blister strip, and then distanced in order to release the blister strip, a lower plate of the pair of plates exhibiting recesses of a shape configured for housing and receiving the pouches of the pouched strip when the plates are locked together to clamp the pouched strip and the cladding film;
a sliding element, arranged consecutively relative to the pair of heat-welding plates in the advancement direction of the pouched strip and the cladding film, for sliding the blister strip released by the pair of heat-welding plates, the sliding element being provided with a curved sliding surface for receiving the blister strip;
a device for forcing the blister strip to slide along, and in contact with, the curved sliding surface of the sliding element; and
a device for directing at least a cooling fluid to cross the sliding element in order to cool the blister strip during sliding thereof along the curved sliding surface,
wherein the device for forcing the blister strip to slide along and in contact with the curved sliding surface of the sliding element comprises at least one pliers gripping organ arranged laterally relative to the sliding element and being predisposed so as to be movable alternatingly with respect to the sliding element in order to follow an extension of the curved sliding surface, the pliers gripping organ being directable to be arranged laterally and at a start of the curved sliding surface, to clamp the blister strip released by the pair of heat-welding plates and to accompany the blister strip in sliding along at least a art of the curved sliding surface.

2. The device of claim 1, wherein the device for forcing the blister strip to slide along and in contact with the curved sliding surface of the sliding element further comprise at least one return roller situated downstream of the sliding element and arranged, with respect to the sliding element, in a position so as to force the blister strip to remain in contact with the curved sliding surface for a whole curvature thereof and to redirect the blister strip in an advancement direction that is suitable for subsequent advancing thereof.

3. The device of claim 1, wherein the curved sliding surface exhibits an arc of circumference shape.

4. The device of claim 3, wherein the sliding element is arranged, with respect to the pair of heat-welding plates and the horizontal advancement tract of the blister strip in such a way that the curved sliding surface having an arc of circumference shape faces downwards.

5. The device of claim 4, wherein the curved sliding surface having an arc of circumference shape exhibits an extension of about 180°.

6. The device of claim 1, wherein the curved sliding surface exhibits grooves having a shape adapted for internally receiving the pouches present in the pouched strip in such a way that said pouches can slide therein.

7. The device of claim 1, wherein the device for directing at least one cooling fluid to cross the sliding element comprises a tube in a serpentine shape situated internally of the sliding element and exhibiting a development which follows the extension of the curved sliding surface, the tube carrying a cooling fluid.

8. The device of claim 7, wherein the device for directing at least one cooling fluid to cross the sliding element comprises at least one nozzle, connected to a source of compressed air, which is arranged between the pair of heat-welding plates and the sliding element in such a way as to direct a flow of compressed air generated by a compressed air source towards the sliding element between the blister strip and the curved sliding surface.

9. The device of claim 1, further comprising a frame which supports the pair of heat-welding plates and the sliding element and on which frame the at least one pliers gripping organ is rotatably pivoted, the frame being movable in alternating translation with respect to the advancement direction M of the pouched strip and the cladding film applied on the strip.

10. The device of claim 9, wherein the frame is translatingly movable with respect to the pouched strip and the cladding film applied thereon, in an opposite direction to the advancement direction of the pouched strip when the pair of heat-welding plates are distanced from one another, and further movable in translation in the same advancement direction as the pouched strip when the pair of heat-welding plates are clamped for heat-welding, such that the clamped plates accompany the advancement of the pouched strip along the horizontal tract during the heat-welding.

11. The device of claim 10, wherein the frame is mounted on a slide activatable in alternated translation by actuator organs.

12. A sealing device for sealing a pouched strip to a cladding film so as to obtain a blister strip, the pouched strip being advanced in an advancement direction along a horizontal advancement tract and the cladding film being applied on the pouched strip during advancement thereof along the horizontal advancement tract, the sealing device comprising:

a pair of heat-welding plates arranged opposite one another and cyclically movable in such a way as to reciprocally lock in order to clamp the pouched strip and the cladding film applied thereon together for performing a reciprocal sealing thereof by heat-welding, thereby obtaining a blister strip, and then distanced in order to release the blister strip, a lower plate of the pair of plates exhibiting recesses of a shape configured for housing and receiving the pouches of the pouched strip when the plates are locked together to clamp the pouched strip and the cladding film;

a sliding element, arranged consecutively relative to the pair of heat-welding plates in the advancement direction of the pouched strip and the cladding film, for sliding the blister strip released by the pair of heat-welding plates, the sliding element being provided with a curved sliding surface for receiving the blister strip;

a device for forcing the blister strip to slide along, and in contact with, the curved sliding surface of the sliding element; and a device for directing at least a cooling fluid to cross the sliding element in order to cool the blister strip during sliding thereof along the curved sliding surface, wherein the device for directing at least one cooling fluid to cross the sliding element comprises a tube in a serpentine shape situated internally of the sliding element and exhibiting a development which follows the extension of the curved sliding surface, the tube carrying a cooling fluid.

13. The device of claim 12, wherein the device for directing at least one cooling fluid to cross the sliding element comprises at least one nozzle, connected to a source of compressed air, which is arranged between the pair of heat-welding plates and the sliding element in such a way as to direct a flow of compressed air generated by a compressed air source towards the sliding element between the blister strip and the curved sliding surface.

* * * * *